(12) United States Patent
Timashev et al.

(10) Patent No.: US 8,745,444 B2
(45) Date of Patent: *Jun. 3, 2014

(54) ITEM-LEVEL RESTORATION AND VERIFICATION OF IMAGE LEVEL BACKUPS

(71) Applicant: Veeam Software AG, Baar (CH)

(72) Inventors: Ratmir Timashev, Mercer Island, WA (US); Anton Gostev, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,434

(22) Filed: Mar. 15, 2013

(65) Prior Publication Data
US 2013/0212437 A1    Aug. 15, 2013

Related U.S. Application Data

(63) Continuation of application No. 12/901,233, filed on Oct. 8, 2010, now Pat. No. 8,402,309.

(60) Provisional application No. 61/250,586, filed on Oct. 12, 2009, provisional application No. 61/302,743, filed on Feb. 9, 2010.

(51) Int. Cl.
*G06F 11/00* (2006.01)

(52) U.S. Cl.
USPC ............................................................ 714/15

(58) Field of Classification Search
USPC ......... 714/15, 16, 2, 20, 6.1, 6.12, 6.13, 38.1; 711/161, 162; 707/602, 674, 676–679
See application file for complete search history.

(56) References Cited

U.S. PATENT DOCUMENTS

| 6,931,558 | B1 | 8/2005 | Jeffe et al. |
| 7,093,086 | B1 | 8/2006 | Van Rietschote |
| 7,191,299 | B1 | 3/2007 | Kekre et al. |
| 7,254,682 | B1 | 8/2007 | Arbon |

(Continued)

OTHER PUBLICATIONS

VMware, "vSphere Basis System Administration, vCenter Server 4.0, ESX 4.0, ESXi, 4.0," Jun. 16, 2009, pp. 1-374, retrieved from the internet: URL: http://replay.waybackmachine.org/20091011004437/http://www.vmware.com/pdf/vsphere4/r40/vsp_40_admin_guide.pdf>, Table of contents; chapter 1; chapter 17.

(Continued)

*Primary Examiner* — Dieu-Minh Le
(74) *Attorney, Agent, or Firm* — Sterne, Kessler, Goldstein & Fox P.L.L.C.

(57) ABSTRACT

Systems and methods for item-level restoration from and verification of an image level backup without fully extracting it. The method receives backup parameters and selection of an image level backup to restore or verify and initializes virtual storage. The method attaches the virtual storage to a hypervisor to launch a virtual machine (VM) to test and restore data objects. The method stores VM virtual disk data changes resulting from restoration and verification in a changes storage. The method optionally reconfigures VMs to use an isolated network. The method optionally uses a routing appliance to provide access to VMs running in the isolated network from a production network. The method determines if the VM operating system (OS) is able to start using restored copies of selected data objects and tests applications associated with selected data objects. The method displays restoration and test results in an interface and automatically delivers the results.

28 Claims, 12 Drawing Sheets

(56) References Cited

U.S. PATENT DOCUMENTS

| | | |
|---|---|---|
| 8,135,985 B2 * | 3/2012 | Mishra et al. .................. 714/13 |
| 8,332,689 B2 * | 12/2012 | Timashev et al. ............... 714/15 |
| 8,364,638 B2 * | 1/2013 | Nickolov et al. ............. 707/636 |
| 8,402,309 B2 * | 3/2013 | Timashev et al. ............... 714/15 |
| 2002/0100036 A1 | 7/2002 | Moshir et al. |
| 2008/0275924 A1 | 11/2008 | Fries |
| 2009/0094603 A1 | 4/2009 | Hiltgen et al. |
| 2009/0150510 A1 | 6/2009 | Kovacs et al. |
| 2009/0222496 A1 | 9/2009 | Liu et al. |
| 2009/0313447 A1 | 12/2009 | Nguyen et al. |
| 2010/0107158 A1 | 4/2010 | Chen et al. |
| 2010/0325471 A1 * | 12/2010 | Mishra et al. ..................... 714/3 |
| 2011/0153697 A1 | 6/2011 | Nickolov et al. |
| 2012/0102135 A1 | 4/2012 | Srinivasan et al. |
| 2012/0151250 A1 * | 6/2012 | Saika ........................... 714/4.11 |
| 2012/0254861 A1 * | 10/2012 | Down et al. ....................... 718/1 |

OTHER PUBLICATIONS

International Search Report and Written Opinion of the International Searching Authority directed to related International Application No. PCT/US2010/051908, mailed May 25, 2011.

* cited by examiner

900

New DR-V Job (Edit DR-V Job)

Application Group
Choose Application Group for this job and verify that all required backups are available.

Name:

Application Group 1   934

Application Group's descriptions should be displayed here once the Application Group is selected. This is the 2nd line of description. Truncate the following lines with ...   935

Application Group settings:   936

| VM | Role | Guest OS | Backup Status |
|---|---|---|---|
| coldc1 | DC, GC | Windows 2008 | OK (11.11.09 21:34) |
| exchprod | Exchange | Windows 2008 | NOT FOUND |
| | | | |
| | | | |

< Back   828     Next >   830     Cancel   832

FIG. 9

DR-V Test Settings

Customize the tests to be performed for each VM in the application group:

| VM | Role | Heartbit | Ping |
|---|---|---|---|
| srv | DHCP | ✓ | ✓ |
| coldc1 | DC, DNS | ✓ | ✓ |
| exchprod | EX | ✓ | ✓ |
| appsrv | My Oracle DB | ✓ | ✓ |

1134

Test Live VM — 1136

OK — 1138   Cancel — 832

ITEM-LEVEL RESTORATION AND VERIFICATION OF IMAGE LEVEL BACKUPS

CROSS-REFERENCE TO RELATED APPLICATIONS

The present application is a continuation of U.S. Non-Provisional patent application Ser. No. 12/901,233, filed on Oct. 8, 2010, now allowed, which claims the benefit of U.S. Provisional Patent Application No. 61/250,586, filed on Oct. 12, 2009, entitled "Item-Level Restoration From Image Level Backup," and U.S. Provisional Patent Application No. 61/302,743, filed on Feb. 9, 2010 entitled "Systems, Methods, and Computer Program Products for Verification of Image Level Backups," which are incorporated by reference herein in their entireties.

FIELD OF THE INVENTION

The present invention is related to data backup and recovery. In particular, the present invention relates to methods, systems, and computer program products for verifying the recoverability of virtual machine data stored in an image level backup file, and recovering such data.

BACKGROUND OF THE INVENTION

Restoration of items from backups and verification of recoverability from backups has been a concern throughout the era of the personal computer and distributed client server systems. Users need an ability to restore individual application items from full image level backups, including, but not limited to, backups, snapshots, copies, and replicas. Some examples of data items that typically need to be restored include:

an individual mailbox or email message from an email server backup, such as, but not limited to, a backup of a MICROSOFT™ Exchange server;

an individual user from directory server backup, such as, but not limited to a MICROSOFT™ Active Directory backup;

an individual table, view, or other database object from a database server backup, such as, but not limited to a backup of a MICROSOFT™ SQL SERVER™, ORACLE™, SYBASE™, or MYSQL™ database server; and an individual document from a content library, such as, but not limited to a backup of a MICROSOFT™ SharePoint server.

Conventional methods for restoration of application items require application item-level processing during backup. Thus, the data for item-level restorations is readily available with this approach. However, conventional item backup techniques have a number of drawbacks. First, they require backup agents running next on the application server. Second, they typically require the same data to be backed up twice (on both the image-level and the object-level). This results in slower backup performance and larger backup files which contain redundant data within them.

Other conventional backup solutions are based on reverse-engineering of a proprietary binary storage format and extracting the data directly from a file used by an application that stores the data. Some examples of such files include MICROSOFT™ Exchange MDB files and MICROSOFT™ Active Directory NTDS.DIT files. An example of such a solution is Kroll OnTrack. Before application item-level restoration can take place, the required files to be extracted from the image-level backup files. An example of such two-step approach is a bundle of Vizioncore VRANGER PRO™ (performing Exchange MDB file recovery from image-level backup file) and QUEST™ Recovery Manager for Exchange products (performing individual item recovery from the extracted Exchange MDB file using low level API).

This conventional item-level restoration technique has a number of drawbacks as well. It usually requires the necessary file to be restored from an image level backup to the object-level restore application, which requires additional time and system resources. Some conventional solutions also involves using the undocumented APIs or proprietary binary structure of the underlying files. This makes the restoration approach unreliable, because any application patch or modification resulting in changes of the binary storage structure will render the restoration solution inoperable.

Conventional solutions also imposes a high cost of developing and maintaining the solution because of a need to reverse-engineer internal undocumented APIs or the binary storage format and update the product as the storage format or APIs are adjusted by a vendor due to updates or patches.

Finally, conventional solutions do not guarantee recoverability of data. Backup administrators cannot know if the particular backup is good, restorable, and contains valid uncorrupted data—until they actually try to restore the data. Administrators have to take risks because traditional methods of backup recoverability verification do not provide reasonable means to test every produced backup.

Traditional methods for backup recoverability testing include manual procedures involving the complete restoration of image-level backup into an isolated environment. In order to conserve storage space, backup files are typically highly compressed and/or de-duplicated. For example, some commercially available backup tools, such as VEEAM™ Backup from Veeam Software International Ltd., provide mechanisms for deduplication and compression of image level backup files. Deduplication may be applied when backing up multiple virtual machines (VMs) that have similar data blocks within them.

With deduplication, identical disk blocks or blocks of free space are eliminated from a backup file, which decreases the size of the created image level backup file. However, while deduplication serves to decrease the size of backup files, it increases the amount of time needed to perform subsequent backup verification and restorations from the backup files, because the backup data is no longer stored in native format.

Another means for decreasing the backup size is compression. Again, while compression decreases the size of created backup files, it increases the duration for backup creation, verification, and restoration procedures.

In order to enhance security, backup files are also often encrypted. Thus, in an initial step, backup files may need to be extracted (i.e., decompressed) and/or decrypted completely back to the native format before their contents can be read. Then, in case with some applications (such as MICROSOFT™ Active Directory Domain Controller) the extracted data is copied over to an isolated test environment, so the production environment is not affected during the testing. If the tested service relies on more than one application to run, the steps are repeated for all other applications. Finally, all of the service dependencies are started, and testing is performed to ensure that the service is working normally and the data is not corrupted.

With conventional backup verification approaches, executing backup verification can be a time-consuming process due to involving decompressing, decrypting, extracting, and staging the full contents of an image level backup in a test environment before verification can commence. Traditional backup verification methods do not enable system administrators to quickly and thoroughly verify correct recoverability of an image level backup, instead typically relying on manual verification. Accordingly, what is needed is a system to enable administrators to quickly and accurately verify the recoverability of an image level backup.

Thus, traditional item backup restoration and verification solutions have a number of drawbacks. These traditional solutions typically require that the backup file to be verified or to be used for an item-level restoration be fully extracted first, which requires significant free disk space and time. For example, it may take hours to extract and copy a backup's contents to a test environment due to the large size of image level backups. This approach typically requires dedicated hardware and storage resources, such as an isolated test environment or computer lab, in order to conduct the testing of the restored data objects. Additionally, such backup restoration and testing requires a significant amount of manual operation and intervention from administrators, such as initiating restores, test environment configuration, and testing operation of restored applications and data objects. Due to all these factors, it is simply impractical to perform recoverability testing and disaster recovery exercises on more than a small scope of backups, and more often than a few times per year. This means that recovery of data from a majority of backups simply cannot be guaranteed. Similarly, performing an item-level restore may take too much time, as compared to the time it takes to perform a full computer restore.

Therefore, there is a need for an efficient low cost methods for recovering an item from an image level backup and for testing recoverability of image-level backups.

SUMMARY OF THE INVENTION

Embodiments of the invention include methods, systems, and computer program products for recovering an application-level item from an image level backup and verifying the recoverability of data stored in an image level backup. Example methods for recovering file system objects from an image level backup without requiring the restoration process to be executed on a computer running an operating system (OS) that supports the virtual disk file system type backed up in the image level backup are described in U.S. Provisional Patent Application No. 61/354,529, filed on Feb. 9, 2010 entitled "Cross-Platform Object Level Restoration From Image Level Backups", which is incorporated herein by reference in its entirety.

The methods, systems, and computer program products perform item restoration and backup verification that substantially obviates one or several of the disadvantages of traditional approaches.

Embodiments of the present invention are related to a system and method for recovering an item from an image level backup. In an embodiment of the invention, a system restores individual application-level items or objects directly from an image level backup, snapshot, copy or replica without prior incremental restorations of individual data files from an image level backup. For example, restoration of a single row of a relational database table without restoration of the entire relational database file from the backup is enabled.

According to an exemplary embodiment, existing Application Programming Interfaces (APIs) for application item-level restore operations are used. An exemplary method does not rely on a binary storage format data and is, therefore, not affected by patches or application updates that change a binary storage format used by an application.

In an embodiment, an item restoration method does not employ reverse-engineering of an application's binary storage format. The method does not require additional development in order to support the applications when the storage format is adjusted due to installation of upgrades, patches or other modifications.

Embodiments of the invention include a system for verification of an image level backup without prior incremental restorations of data from the image. For example, the system can verify that a MICROSOFT™ Exchange server stored in an image level backup can be successfully booted up without having to first restore the entire MICROSOFT™ Exchange server image from the image level backup.

Embodiments of the invention additionally use virtual storage to provide access to data stored inside of image level backups (i.e., backup images).

In an embodiment, the backup verification method does not require performing a full restore of the backup before the testing can be started, and therefore, does not require large amount of free disk space to host the extracted data, or time for extraction.

Embodiments of the invention additionally include a method that eliminates the need for isolated, dedicated hardware and storage resources. Instead, in an embodiment, the method uses a small amount of production system resources to verify image level backups. In another embodiment, the amount of resources used during backup verification can optionally be controlled by a dedicated resource pool, to ensure that backup verification activities do not negatively affect the production environment.

In accordance with an embodiment of the invention, a method for backup verification is fully automated and does not require manual configuration of a test environment, or manual application testing to be performed by providing the ability to automate it. In addition, because the verification is automated, it can be scheduled for off hours or weekends, when the production environment usually has extra free capacity to handle backup verification activities.

Embodiments of the invention additionally include a computer-readable medium having computer-executable instructions stored thereon that, if executed by a computing device, cause the computing device to perform operations for image level backup verification and item restoration.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

FIGS. 8-11 illustrate an exemplary graphical user interface (GUI), wherein image level backups can be verified, in accordance with an embodiment of the invention.

Figure 1:
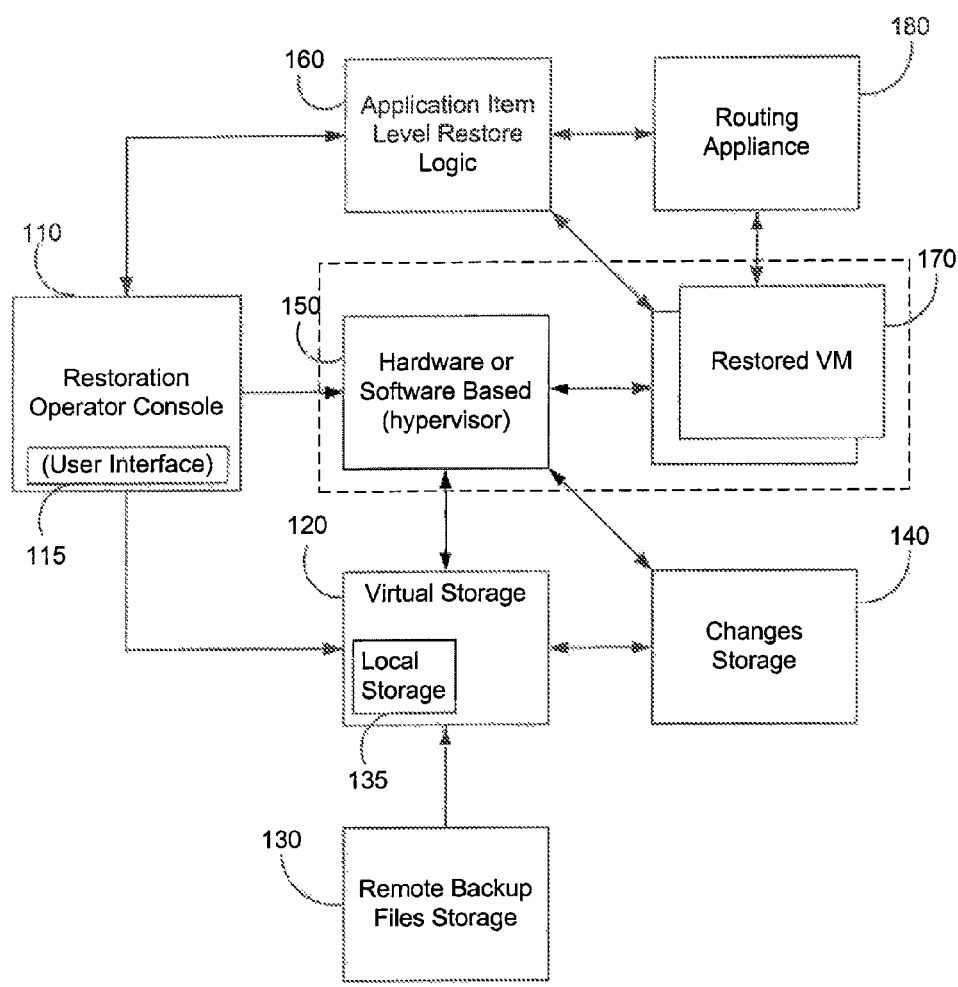
FIG. 1 illustrates a modular view of an item-level restoration system architecture, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Unless specifically stated differently, a user, an operator, and an administrator are interchangeably used herein to identify a human user, a software agent, or a group of users and/or software agents. Besides a human user who needs to restore items from image level backups and verify image level backups, a software application or agent sometimes needs to verify backups. Accordingly, unless specifically stated, the terms "operator," "administrator," and "user" as used herein do not necessarily pertain to a human being.

As used herein, in an embodiment, the term "server" encompasses computing devices that are designed to function as one or more of email servers, Domain Name System (DNS) servers, Domain Controller (DC) servers, application servers, database servers, web servers, firewall servers, and other enterprise servers, file servers, and back end servers. A server may be comprised of one or more server machines. A server may be implemented as a collection of servers such as a server farm or server cluster. For example, web servers may be commercially available server machines with one or more central processing units (CPUs). Alternatively, these web servers may comprise multiple computing devices and/or computing functionality hosted on multiple server machines (i.e., a server farm).

The present invention relates to improved systems, methods, and computer program products for verifying image level backups.

Item-Level Restoration Architecture

FIG. 1 depicts system architecture 100 for item-level restoration, in accordance with an embodiment of the invention. A restoration operator console 110 represents a user interface for item-level restore operators. The user interface can be used to select an application to be restored, a location of an image level backup file, restoration time and application items to be restored. Restoration operator console 110 is also used to configure and manage system 300 depicted in FIG. 3.

A virtual storage 120 is an application (or process) that allows representing (publishing) in native (source) format the entire (or partial) content from the required image level backup file located in a local or remote backup files storage 130. In embodiments of the invention, a virtual storage 120 can be implemented in the form of a process, a software agent, an application, a virtual machine (VM), hardware, a software appliance, or a combination of hardware and software that allows representing either the entire or partial content of a requested backup file in native format.

As used herein, "virtual storage" refers to logical storage that has been abstracted and separated from physical storage, such as network attached storage (NAS), file servers, disks, and other physical storage devices. In an embodiment "virtual storage" is logical storage implemented via virtual storage logic and is viewable within a computer infrastructure as one or more storage devices, which are separated from physical storage disks. As used herein, a "virtual machine" (VM) is a software implementation of a machine such as a server, computer, or other computing device that supports the execution of a complete operating system (OS) and executes application programs like a physical machine. A VM is a software implementation that duplicates the functionality of a physical machine implemented in hardware and software. Software applications and the OS running on a VM are limited to the resources and abstractions provided by the VM. In an embodiment, virtual machines (VMs) are viewable within an overall virtual infrastructure. According to an embodiment of the invention, the image-level backup file to restore an item from can be located in local storage 135 or remote backup files storage 130. In the exemplary embodiment depicted in FIG. 1, remote backup files storage 130 is used to store backup files containing complete image-level backup of a computer or server. These backup files are typically highly compressed and de-duplicated to reduce the amount of storage required; in some cases, they are also encrypted for security reasons. Virtual storage 120 can be made available to consumers as locally attached storage, or via public or proprietary storage or data access protocols such as, but not limited to the Network File System (NFS), Common Internet File System (CIFS), and Internet Small Computer System Interface (iSCSI).

Restoration operator console 110 communicates with a virtual environment implemented on a virtual machine monitor (VMM) or hypervisor 150. As would be understood by one skilled in the relevant art(s), hypervisor 150 may be implemented as software or a combination of hardware and software to implement platform-virtualization software that allows multiple operating systems (OSs) to run concurrently on a single host computer. Virtual storage 120 is accessible by hypervisor 150 that support the same storage format as virtual storage 120 is configured to emulate. For example, virtual storage 120 can appear in the form of an NFS server in the case of VMWARE™ ESX hypervisor, or in the form of a CIFS server in the case of MICROSOFT™ HYPER-V hypervisor. According to an embodiment, hypervisor 150 performs virtual disk image read operations from virtual storage 120 and writes changed virtual disk data back to virtual storage 120, or directly to the changes storage 140. Changes storage 140 stores virtual disk image data changes inflicted by the item level restoration processes described herein. The written data can also be read back by hypervisor 150, in cases when hypervisor needs to access previously changed virtual disk image data blocks. Thus, the exposed images residing inside backup files remain read only and intact on the backup storage for the duration of the item level restoration process.

Virtual storage 120 handles these operations using appropriate formats and stores the modified virtual disk image data on changes storage 140. In accordance with embodiments of the present invention, changes storage 140 can be implemented in the following different ways. Changes storage 140 can be implemented as a part of virtual storage 120 logic by intercepting and re-directing write input/output (I/O) to the designated storage device. Changes storage 140 can also be implemented using native disk I/O redirection capabilities of hypervisor 150 (snapshot, non-persistent disk etc.), when all data changes inflicted by the verification process are redirected to designated storage by hypervisor 150 itself, instead of being committed into a published disk image. In an embodiment, hypervisor 150 can create a snapshot of a disk image to protect the disk image from data changes associated with the backup verification process. Finally, changes storage 140 can be implemented using capabilities of remote backup files storage 130, for example, using storage area network (SAN) snapshots.

Once Virtual Storage 120 is fully initialized and running, restoration operator console 110 issues a command to configure hypervisor 150 and attach the Virtual Storage 120 to hypervisor 150. Once selected one or more VM is published via Virtual Storage 120, this datastore will show a repository of files representing backed up virtual machine. This approach enables hypervisor to access all VM files (i.e. configuration, snapshots, auxiliary files), which in turn enables full hypervisor capabilities for the VM published in this manner. For example, this approach enables using VMWARE™ Storage VMotion to seamlessly migrate the published VM files to another datastore available to hypervisor, which may provide faster I/O performance than Virtual Storage 120 and thus better suit specific recovery tasks the user has.

Hypervisor 150 is used to start up the virtual machine using VM data files published from the image level backup file on Virtual Storage 120. In accordance with embodiments of the invention, hypervisor 150 can be, but is not limited to VMMs such as VMWARE™ Player, MICROSOFT™ VirtualPC, SUN™ VirtualBox, VMWARE™ ESX/ESXi, MICROSOFT™ Hyper-V, CITRIX™ XENServer, PARALLELS™ and other. As it would be apparent to one of skill in the art, other hypervisors 150 and virtualization solutions can be used as well.

More than one virtual machine may need to be started if the application you are restoring from depends on other services. For example, MICROSOFT™ Exchange requires presence of at least one MICROSOFT™ Active Directory Domain Controller Global Catalog server, as well as Domain Name System (DNS) server to start up MICROSOFT™ Exchange services.

Once all the required restored VMs 170 fully boot up and the applications inside of those VMs from which the operator needs to restore individual items are running, the application item level restore logic 160 connects to the running application over the network using standard application programming interfaces (APIs) to get access to application items defined by a restore operator via user interface (UI) 115 of restoration operator console 110. The retrieved application items are then transferred to a location defined by the restore operator. The item can be restored locally to operators' console, or to a remote server. The item can also be injected back into the running application (including the original production application server implemented either on a virtual or a physical computer).

In some cases, restored VMs 170 need to be started up in an isolated network. For example, this may be needed because two computers with the same Internet Protocol (IP) address cannot be started on the same network. However, in many cases, the production computer corresponding to the image backup you are recovering from will already be running on the network at the time of testing. Thus, restored VMs 170 must be running in isolated network. In such cases, routing appliance 180 is used to route network traffic between a production network containing Application Item Restore Logic 160 and isolated network restored VMs 170 are running in, as well as between isolated networks if restored VMs 170 are connected to more than one network.

According to embodiments of the invention, routing appliance 180 can be implemented within system architecture 100 in the form of a process, a software agent, an application, a VM, hardware, a software appliance, or a combination of hardware and software. In an embodiment, routing appliance 180 is used to facilitate application item recovery from an image level backup. When deployed, routing appliance 180 is connected to both an isolated test networks, and a production network. Routing appliance 180 serves as a network router in application item recovery verification system architecture 100 depicted in FIG. 1. Routing appliance 180 acts as a gateway between the production network and routes network traffic between the corresponding restored VMs 170 and computers in the production network. With the help of a proxy application, routing application, or other standard or custom specialized application that routing appliance 180 can accept commands from, routing appliance 180 routes communications between the production network and the isolated test network. In an exemplary embodiment, routing appliance 180 can receive commands from restore operator console 110 and execute the received commands against restored VMs 170 in the isolated test network. Routing appliance 180 then routes response data packets from restored VMs 170 back to the requestor in the production network. In this way, multiple virtual networks are supported while simultaneously keeping the test network isolated from the production network. In one embodiment, routing appliance 180 routes backup verification parameters between application item level restore logic 160 within the production network and restored VMs 170 in the test network.

Item-Level Restoration Method

Figure 2:
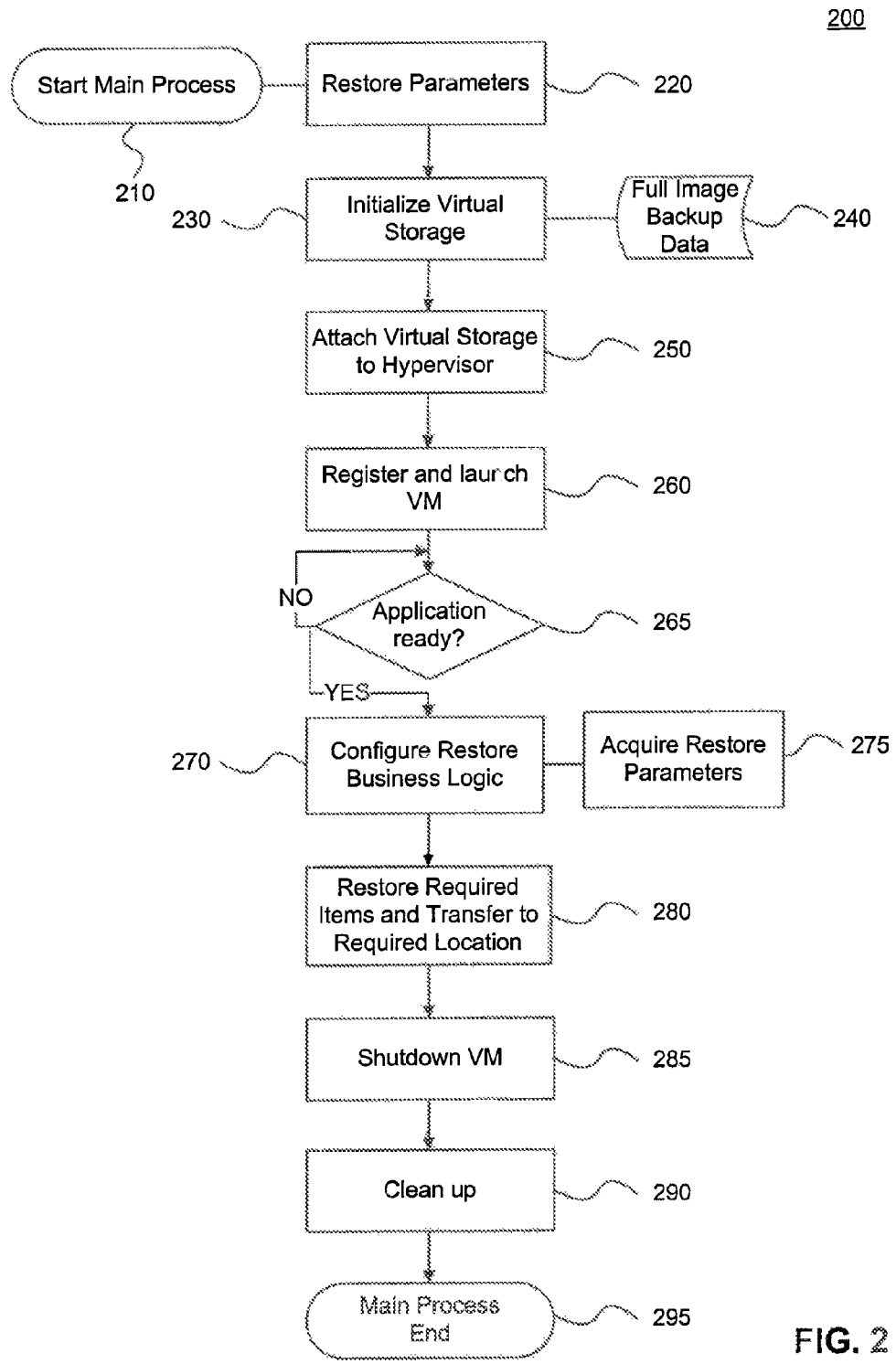
FIG. 2 is a flowchart illustrating steps by which item-level restorations are performed, in accordance with an embodiment of the present invention.

FIG. 2 is a flowchart 200 illustrating steps by which a method is used to restore a data item from an image level backup, in accordance with an embodiment of the present invention.

More particularly, flowchart 200 illustrates the steps by which item-level restorations from image level backups are performed, according to an embodiment of the present invention. FIG. 2 is described with continued reference to the embodiment illustrated in FIG. 1. However, FIG. 2 is not limited to that embodiment. Note that the steps in the flowchart do not necessarily have to occur in the order shown.

Also, some steps are not mandatory (e.g., the VM shutdown described with reference to step 285 below), and can be replaced by similar steps The method begins at step 210 when an item-level restoration process is started.

In step 220, restore parameters are received. In an embodiment, the restore parameters are received from an operator who specifies restore parameters using restoration operator console 110. The restore parameters received in this step may include one or more of an image level backup file location, restore point, VM containing the required application, application-level items to be restored (i.e., restore point to restore to a location), and location to restore the items to. After receipt of the restore parameters, the method proceeds to step 230.

In step 230, Virtual Storage 120 is started. In accordance with an embodiment, an operator, using restoration operator console 110, initializes Virtual Storage 120 by starting a storage service or a process, and attaching corresponding image level backup file(s) from remote backup files storage 130 in step 240 via data conversion engine that performs on-the-fly (on-demand or as-needed) decompression, de-deduplication, decryption and any other operation required to translate specific parts of backup file content into content of original VM data files in the native format. After Virtual Storage 120 is initialized and the image level backup file(s) are attached from remote backup files storage 130, the method proceeds to step 250.

In step 250, the operator console 110 attaches the Virtual Storage 120 to hypervisor 150 by issuing the corresponding hypervisor (or VMM) configuration commands. In step 260, a VM is registered with hypervisor using VM configuration file published from backup file, reconfigured when necessary, and launched. Note that multiple VMs are used in case item restoration requires accessing multiple applications over network. If multiple VMs need to be launched, each VM is started according to a VM dependency list for the application being restored.

According to an embodiment of the invention, restoration operator console 110 monitors the state of applications using ping and/or API commands, and waits until the application is started completely inside the VM, as illustrated by step 265.

In step 265, a determination is made, based on monitoring the status of an application, as to whether the application is ready. If it is determined that the application is ready, control is passed to step 270. If it determined that the application is not ready, control is passed back to step 265 where the application's status is monitored continuously until the maximum allowed application initialization timeout is exceeded.

In step 270, a restoration operator, using restoration operator console 110, configures and starts application item level restore logic 160. In an embodiment, the Application item level restore logic 160 is a process or module that can be run on a remote computer. Alternatively, application item level restore logic 160 can run on a hypervisor, directly inside a VM (with the restored application being injected into the VM, or being already present on VM before the backup was taken). In step 275, the restore parameters are acquired. The restore parameters may include one or more of the Internet Protocol (IP) address of the VM running the application, application objects to be fetched, or a location for saving the restored items. After the application item level restore logic 160 is started, control is passed to step 280.

In step 280, the application item level restore logic 160 connects to the application through restored application's standard APIs, fetches the required items and saves the items to a specified location. Once item restoration process is completed, virtual machines are shut down in step 285. After the VMs are shut down, control is passed to step 290.

In step 290, hypervisor 150 configuration is cleaned up (e.g., virtual machines are deleted) and changes storage data 140 is deleted/discarded.

The application process stops and the method ends in step 295.

Systems for Item-Level Restoration

Figure 3:
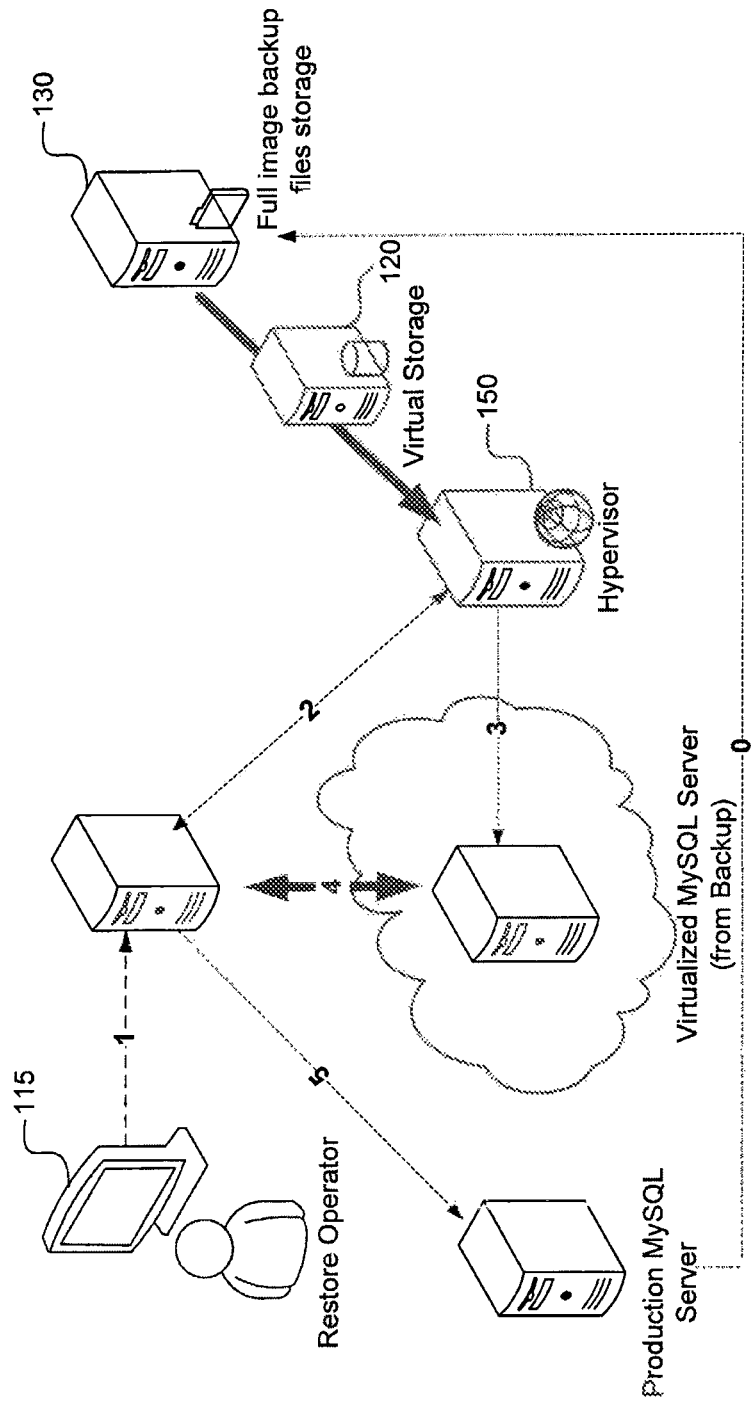
FIG. 3 illustrates an exemplary system used for item-level restoration, in accordance with an embodiment of the present invention.

FIG. 3 illustrates an exemplary system 300 used for item-level restoration. The restoration process is divided by stages for clarity. FIG. 3 is described with continued reference to the embodiment illustrated in FIG. 1. However, FIG. 3 is not limited to that embodiment. An image-level backup of a production server is performed at phase 0 (i.e., at some point in time). At phase 1, a restore operator, using UI 115, selects a backup file, a restoration point, an application, and application items to be restored. As shown in FIG. 1, remote backup files storage 130 is connected to virtual storage 120. Then, at phase 2, business logic launches a VM (containing a required application) on hypervisor 150 from an uncompressed backup file (without prior de-staging, using on-the-fly translation). In the example embodiment illustrated in FIG. 3, the VM contains a MYSQL™ application.

At phase 3, the VM is started in a production network, or network that is isolated from main production environment (not shown on FIG. 3). Note that in this case the application item level restore logic 160 either has access to the isolated network area, or its process is launched directly inside the VM to provide for local access to data. In the embodiment depicted in FIG. 3, the VM started in phase 3 is a MYSQL™ database server running from backup.

In phase 4, once the application inside the VM is completely started and begins to respond, the business logic connects to the application using application's APIs and restores the required application items. If required, in phase 5, the restored items are restored back into the production server (which, otherwise, remains untouched during all operations). In the example embodiment shown in FIG. 3, phase 5 comprises restoring restored items into a production MYSQL™ database server. Alternatively, the restore items are stored in location selected by the restore operator. In an embodiment, the location is selected using UI 115.

As would be understood by one skilled in the art, the method and system described herein for efficient item-level restoration uses application vendor provided APIs and does not rely on reverse-engineering binary storage formats and are, therefore, not affected by OS or application patches or updates which alter binary storage formats used by applications.

Backup Verification Architectures

Figure 4:
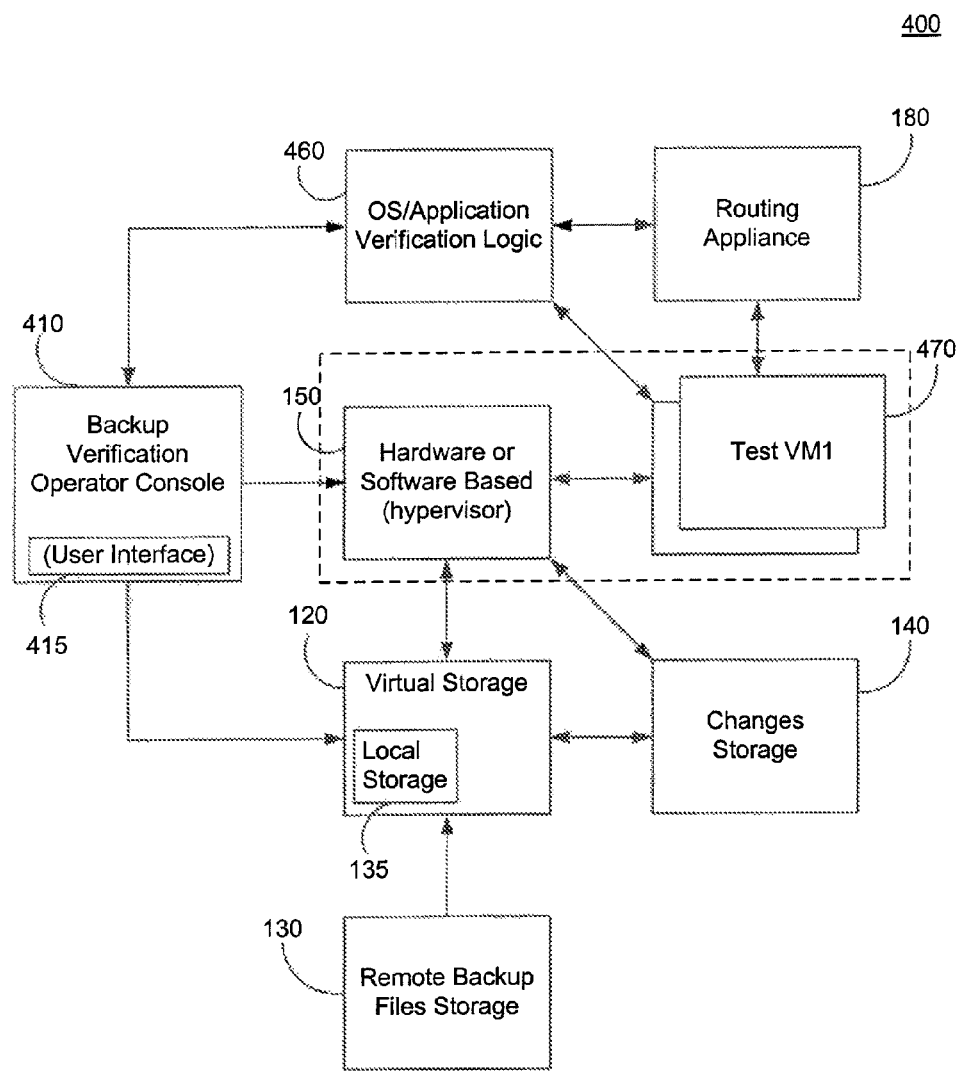
FIG. 4 illustrates a modular view of a backup verification system architecture, in accordance with an embodiment of the present invention.

FIG. 4 depicts system architecture 400 for backup verification, in accordance with an embodiment of the invention. FIG. 4 is described with continued reference to the embodiment illustrated in FIG. 1. However, FIG. 4 is not limited to that embodiment. A backup verification operator console 410 includes a user interface (UI) 415 for backup verification operators. In an embodiment, the UI 415 may be displayed on computer display 1230 shown in FIG. 12. An exemplary embodiment of UI 415 is illustrated in FIGS. 8-11, which are described below. UI 415 can be used to select a backup to be tested, a restoration point to test, and automated tests to be performed. Backup verification operator console 410 is also used to configure and manage systems 600 and 700 illustrated in FIGS. 6 and 7.

In embodiments of the invention, virtual storage 120 described above with reference to FIG. 1 is used in backup verification system architecture 400 and can be implemented in the form of a process, a software agent, an application, a VM, hardware, a software appliance, or a combination of hardware and software that allows representing (publishing) in native (source) format the entire or partial content of a backup file that is to be verified. According to an embodiment of the invention, the requested backup file to be verified can be located in local storage 135 or remote backup files storage 130.

Backup verification operator console 410 communicates with a virtual environment implemented on a virtual machine monitor (VMM) or hypervisor 150. As would be understood by one skilled in the relevant art(s), hypervisor 150 may be implemented as software or a combination of hardware and software to implement platform-virtualization software that allows multiple operating systems (OSs) to run concurrently on a single host computer. Virtual storage 120 is accessible by hypervisor 150 that uses the same storage format as virtual storage 120 it is configured to emulate (for example, virtual storage can appear in form of NFS server in case of VMWARE™ ESX hypervisor, or in form of local storage (via file system filter driver) or CIFS server in case of MICROSOFT™ HYPER-V hypervisor). Hypervisor 150 performs virtual disk image read operations from virtual storage 120 and writes changed virtual disk data back to virtual storage 120, or directly to the changes storage 140. Changes storage 140 stores virtual disk image data changes inflicted by the backup verification processes described herein. The written data can also be read back by hypervisor 150, in cases when hypervisor needs to access previously changed virtual disk image data blocks. Thus, the exposed images residing inside backup files remain read only and intact on the backup storage for the duration of the backup verification process.

Virtual storage 120 handles these operations using appropriate formats and stores the modified disk image data on changes storage 140. In accordance with embodiments of the present invention, changes storage 140 can be implemented in the following different ways. Changes storage 140 can be implemented as a part of virtual storage 120 logic by intercepting and re-directing write input/output (I/O) to the designated storage device. Changes storage 140 can also be implemented using native disk I/O redirection capabilities of hypervisor 150 (snapshot, non-persistent disk etc.), when all data changes inflicted by the verification process are redirected to designated storage by hypervisor 150 itself, instead of being committed into a published disk image. In an embodiment, hypervisor 150 can create a snapshot of a disk image to protect the disk image from data changes associated with the backup verification process. Finally, changes storage 440 can be implemented using capabilities of backup file storage 430, for example, using storage area network (SAN) snapshots.

Once virtual storage 120 is fully initialized, backup verification operator console 410 issues a command to configure hypervisor 150 and attach virtual storage 420 to hypervisor 150 as a datastore containing full repository of files representing backed up virtual machine. This approach enables hypervisor to access all VM files (i.e. configuration, snapshots, auxiliary files), which allows for verification of all VM files (not just virtual disks). This also enables full hypervisor capabilities for the VM published in this manner. For example, this approach enables using VMWARE™ Storage VMotion to seamlessly migrate the published VM files to another datastore available to hypervisor that provides faster I/O performance than Virtual Storage 120 and thus allows for advanced verification scenarios such as full application database integrity check.

Hypervisor 150 is used to start up the test VMs 470 using VM data files from the image level backup. In accordance with embodiments of the invention, hypervisor 150 can be, but is not limited to VMMs such as VMWARE™ Player, MICROSOFT™ VirtualPC, SUN™ VirtualBox, VMWARE™ ESX/ESXi, MICROSOFT™ Hyper-V, CITRIX™ XENServer, PARALLELS™ and other. As it would be apparent to one of skill in the art, other hypervisors 150 and virtualization solutions can be used as well.

More than one test virtual machine may need to be started in the test environment if the tested application depends on other services. For example, MICROSOFT™ Exchange requires the presence of at least one MICROSOFT™ Active Directory Domain Controller Global Catalog server, as well as a Domain Name System (DNS) server to start up MICROSOFT™ Exchange services.

Once all the required test VMs 470 fully boot up from backup and are running, the OS/application verification logic 460 connects to the test VMs 470 over the network to perform automated testing of the functionality of the operating system (OS) and applications. In an embodiment, OS/application verification logic 460 is embodied in an OS/application module that is configured to perform, using backup testing parameters, automated testing of functionality of an OS or an application. In some cases, VMs need to be started up in an isolated network. For example, two computers with the same IP address cannot be started on the same network. However, in many cases, the production computer corresponding to the image backup being tested will already be running on the network at the time of testing. In such cases, routing appliance 180 is used to route network traffic between a production network containing OS/application verification logic 460 and isolated network test VMs 470 are running in, and between OS/application verification logic 460 and a test network containing one or more test VMs 470.

According to embodiments of the invention, routing appliance 180 can be implemented in the form of a process, a software agent, an application, a VM, hardware, a software appliance, or a combination of hardware and software. When deployed, routing appliance 180 is connected to both the isolated test network and the production network. Routing appliance 180 serves as a network router in the backup verification system. Routing appliance 180 acts as a gateway between the production network and routes network traffic between the corresponding test VMs 470 and computers in the production network. With the help of a proxy application, routing application, or other standard or custom specialized application that routing appliance 180 can accept commands from, routing appliance 180 routes communications between the production network and the isolated test network. In an exemplary embodiment, routing appliance 180 can receive commands from backup verification operator console 410 and execute the received commands against test VMs 470 in the isolated test network. Routing appliance 180 then routes response data packets from test VMs 470 back to the requestor in the production network. In this way, multiple virtual networks are supported while simultaneously keeping the test network isolated from the production network. In one embodiment, routing appliance 180 routes backup verification parameters between OS/application verification logic 460 within the production network and test VMs in the test network.

Backup testing procedures can be application-specific. For example, backup testing procedures to verify recoverability of applications backed up in a full image level backup of a database server may include querying individual database tables to verify contents of data records and fields within a database. Similarly, backup testing procedures to verify data objects backed up in a full image level backup of an email server may include verifying restoration of saved email messages, calendar appointments, and/or address book entries. Backup testing procedures can include, but are not limited to:

Pinging a test VM, such as test VM 470;

Querying the status of an OS process or a service that is expected to be running;

Querying the contents of an operating system (OS) log files, an application log file, or an events database;

Establishing connection to running applications using standard application programming interfaces (APIs);

Running test scripts or executable files against applications; and

Leaving the VM running to allow for manual verification by an operator.

In one embodiment of the present invention, the sample non-limiting Windows Management Instrumentation (WMI) script provided below can be run to test applications to verify data objects backed up in a full image level backup. The following script is an embodiment for checking the last boot up time for a remote computer. In this embodiment, the script connects to the specified remote computer and queries and returns its last boot time. In an embodiment, the script provided below is useful for backup verification, as it will not return a last boot time unless the remote computer's OS is running and most of its components are functioning correctly. For example, by running the Visual Basic Scripting Edition (VBScript) code sample provided below, an operator can attempt to connect to a specified remote computer and query the remote computer to determine its most-recent boot up/start up time as part of the backup verification process. As would be appreciated by one of skill in the relevant arts, tests that are more complex can be implemented via scripts and executable ales in a similar manner. For example, a script can be executed to remotely query a remote computer's system event log and look for events indicating that required system services have started (i.e., entered the running state) successfully. As would be appreciated by one of skill in the relevant arts, other scripting and programming languages and technologies can be used to implement the verification in the script code sample below.

```
Option Explicit
' Declare variables
Dim blnQuiet
Dim intValidArgs
Dim colItems, objItem, objWMIService
Dim strBoot, strBootDate, strBootDay, strBootHour, strBootMins
Dim strBootMonth, strBootTime, strBootYear, strComputer, strMsg,
strQuery
intValidArgs = 0
' Check command line parameters
With WScript.Arguments
    Select Case .Unnamed.Count
        Case 0
            ' Default if none specified is local computer (".")
            Set objWMIService = GetObject( "winmgmts://./root/cimv2" )
            strQuery = "Select * from Win32_ComputerSystem"
            Set colItems = objWMIService.ExecQuery( strQuery, , 48 )
            For Each objItem in colItems
                strComputer = objItem.Name
            Next
        Case 1
            ' Command line parameter can either be a computer
            ' name or "/?" to request online help
            strComputer = UCase( Wscript.Arguments(0) )
        Case Else
            ' Maximum is 1 command line parameter, except for the switch
            Syntax
    End Select
    If .Named.Exists( "Q" ) Then
        blnQuiet = True
        intValidArgs = intValidArgs + 1
    End If
    If intValidArgs < > .Named.Count Then Syntax
End With
' Enable error handling
' On Error Resume Next
' Connect to specified computer
Set objWMIService = GetObject( "winmgmts://" & strComputer &
"/root/cimv2" )
' Display error number and description if applicable
If Err Then ShowError
Set colItems = objWMIService.ExecQuery( "Select * from Win32_
OperatingSystem",, 48 )
For Each objItem in colItems
    If blnquiet Then
        strMsg = Left( objItem.LastBootUpTime, 12 )
    Else
        strBootYear = Left( objItem.LastBootUpTime, 4 )
        strBootMonth = Mid( objItem.LastBootUpTime, 5, 2 )
        strBootDay = Mid( objItem.LastBootUpTime, 7, 2 )
        strBootDate = DateValue( strBootDay & "-" & strBootMonth &
"-" & strBootYear )
        strBootHour = Mid( objItem.LastBootUpTime, 9, 2 )
        strBootMins = Mid( objItem.LastBootUpTime, 11, 2 )
        strBootTime = strBootHour & ":" & strBootMins
        strBoot = strBootDate & ", " & strBootTime
        strMsg = "Last boot time of " & strComputer & ": " & strBoot
    End If
Next
' Display results
WScript.Echo strMsg
'Done
WScript.Quit(0)
Sub ShowError( )
    strMsg = vbCrLf & "Error # " & Err.Number & vbCrLf _
        & Err.Description & vbCrLf & vbCrLf & vbCrLf
    Syntax
End Sub
Sub Syntax( )
    strMsg = strMsg _
        & "LastBoot.vbs" _
        & vbCrLf _
        & "Displays last boot time for any WMI enabled computer" _
        & vbCrLf & vbCrLf _
        & "Usage: CSCRIPT //NoLogo LASTBOOT.VBS
[ computer_name ] [/Q ]" _
        & vbCrLf & vbCrLf _
        & "Where: ""computer_name"" is an optional remote
computer name" _
        & vbCrLf _
        & "    (default is the local computer name)"
        _
        & vbCrLf _
        & "    /Q   outputs date/time only, in
YYYYMMDDhhmm format" _
        & vbCrLf _
        & "    (default is message and DD-MM-YYYY,
hh:mm format)" _
        & vbCrLf & vbCrLf
    WScript.Echo strMsg
    WScript.Quit 1
End Sub
```

Backup Verification Methods

Figure 5:
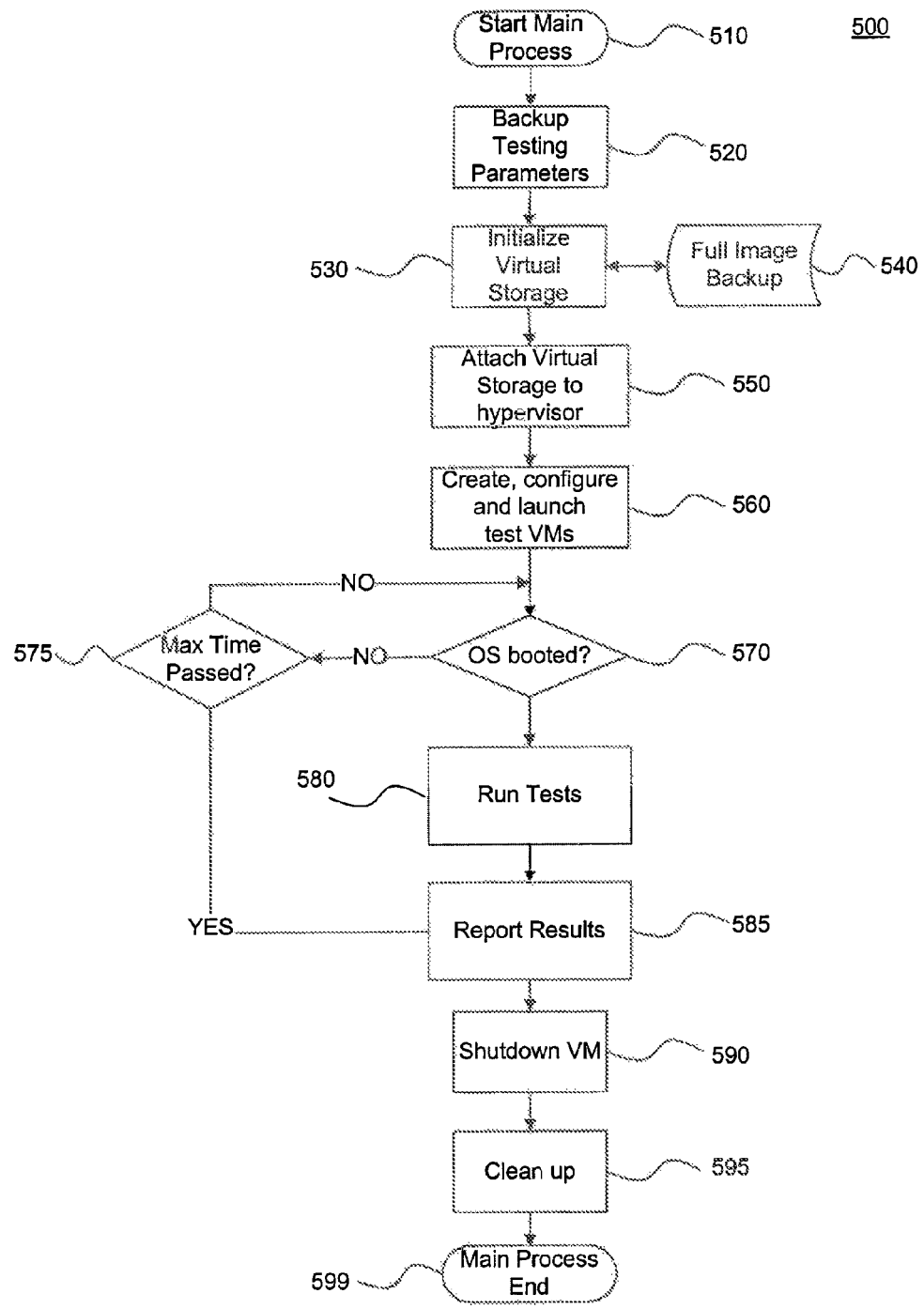
FIG. 5 is a flowchart illustrating steps by which backup verification is performed, in accordance with an embodiment of the present invention.

FIG. 5 is a flowchart 500 illustrating steps by which a method is used to verify an image level backup, in accordance with an embodiment of the present invention.

More particularly, flowchart 500 illustrates the steps by which an image level backup is tested using virtual storage and test VMs, according to an embodiment of the present invention. FIG. 5 is described with continued reference to the embodiments illustrated in FIGS. 1 and 4. However, FIG. 5 is not limited to those embodiments. Note that the steps in the flowchart do not necessarily have to occur in the order shown.

The method begins at step 510. When the method begins in step 510, an image-level backup of production servers or any other computers/servers has already been performed (i.e., at some past point in time), and the produced backup files have been put on a backup storage. In accordance with an embodiment, the image level backup was run with knowledge of what VMs are needed for a restore.

Backup storage may be remote backup files storage 130 described with reference to FIG. 6 below. As would be appreciated by one of skill in the relevant arts, backup storage may be one or more file servers, Network-attached storage (NAS), a SAN, disk arrays, optical jukeboxes, or other storage devices.

In step 520, backup testing parameters are received. The backup testing parameters may include one or more of an image level backup file location, backup file entities to be tested in cases when a backup file contains multiple image backups, a recovery point to test, and an application test to perform. According to an embodiment, the backup testing parameters are received from backup verification operator console 410 where an operator specifies backup testing parameters. In an embodiment of the invention, a recovery point can be a specific point in time, such an hour, minute or second of a day the backup was created. Alternatively, the recovery point can be a range of times or a date. The selected recovery points received in step 520 depend upon the frequency of full and incremental backups taken. For example, in environments where full image level backups are taken daily and incremental backups are taken hourly, the granularity of recovery points will be limited to selected hours of the day corresponding to the incremental backups. After receipt of the backup testing parameters, the method proceeds to step 530.

In step 530, virtual storage 120 is started. In an embodiment, step 530 is performed when backup verification operator console 410 initializes virtual storage 120 by starting a storage service or a process, and attaches corresponding image level backup file(s) from remote backup files storage 130 or local storage 135. After virtual storage 120 is started, the method proceeds to step 540.

In step 540, a data conversion engine starts to perform on-the-fly (on-demand or as-needed) decompression, de-deduplication, decryption and/or any other operator or system specified operation required to translate portions of the backup file into contents of original VM data files in the native format. In an embodiment, in cases when the full image level backup files contain multiple image level backups, the multiple VM data file sets may be viewed as separate entities on Virtual Storage 120. For example, in UI 415, multiple VMs may be displayed as multiple folders. According to an embodiment, after the data conversion engine translates the backup file contents, it presents the contents to hypervisor as a local or network attached storage showing all VM files located in the backup file. Step 540 enables greatly reduced times for backup recoverability verification because instead of extracting an entire backup file, only requested data blocks are extracted, and only at the time they are requested (i.e., on-the-fly and as-needed). The exposed images residing in the backup files remain read-only during the method illustrated in flowchart 500. Thus, in one embodiment, all required virtual disk changes due to disk write operations are redirected to temporary storage using native hypervisor 150 functionality (if such functionality is provided by specific hypervisor). Alternatively, all required virtual disk changes due to disk write operations are redirected to temporary storage using virtual storage 120, for example in cases where hypervisor 150 lacks functionality to handle virtual disk changes.

After the translation of selected portions of the image level backup is performed, and the backup file content list is available, the method proceeds to step 550.

In step 550, virtual storage 120 is attached to hypervisor 150. In accordance with an embodiment of the invention, this step can be performed when hypervisor configuration commands are received via backup verification operator console 410. For example, an operator, using UI 415 within backup verification operator console 410 can issue the corresponding hypervisor configuration commands. Step 550 is performed without making any changes to the full image level backup accessed in step 540. In this way, all virtual disk data changes inflicted during the backup verification method is performed are stored as non-persistent data. In an embodiment, the non-persistent data needed during the backup verification method may be stored in changes storage 140. After virtual storage 120 is attached to hypervisor 150, the method proceeds to step 560.

In step 560, a VM is registered with hypervisor, re-configured if necessary, and launched. In an embodiment, test VM resource allocation settings are often reconfigured to reduce the amount of consumed resources. For example, while original production VMs are usually heavily loaded by users and thus require significant CPU and memory resources, test VMs 470 are not used by multiple users and may have their available resources reduced significantly to allow for more efficient use of production capacity allocated to backup verification activities. According to an embodiment, in order to ensure that backup verification does not affect production, test VM network settings are reconfigured from the original production network settings to instead use the test network. According to an embodiment, multiple test VMs are created, configured and launched in this step if some applications associated with backup files to be tested require access to shared resources or multiple servers (represented as multiple test VMs) to be able to run. If multiple test VMs need to be launched in step 560, each test VM is started according to a test VM dependency list for the application being restored. Once the required one or more test VMs are created, configured and launched, the method proceeds to step 570.

In Steps 570 and 575, determinations are Made, based on monitoring the startup of an OS on the test VM(s) whether the OS has booted successfully on the test VM within a predetermined timeout period. In an embodiment, step 570 includes determining whether the OS has booted successfully when the test VM OS status changes to "Running." In accordance with an embodiment, the predetermined timeout period is a tunable parameter that can be selected within UI 115 in backup verification operator console 410.

In one embodiment, step 570 is performed by monitoring the OS boot from backup verification operator console 410. Alternatively, OS/application verification logic 460 monitors the state of the operating systems running on test VMs, and waits a predetermined timeout period for the operating systems to fully boot up. According to an embodiment, step 570 comprises determining if an OS has fully booted up using one or more files from the image level backup being verified. In an embodiment, to verify that an OS has successfully booted up, OS/application verification logic 460 may perform simple check to verify that an OS process or application is running. Alternatively, the value of an OS system variable, presence of a semaphore, contents of a database record or log file, flag, or a system readiness state can be used by OS/application verification logic 460 to verify that an OS has booted. For example, in an embodiment, using a VMWARE™ hypervisor, the status of VMWARE™ Tools application can be used by the OS/application verification logic 460 to determine whether operating system is fully booted and running. If it is determined that the OS has fully booted up, control is passed to step 580. If it determined that an OS has not fully booted, control is passed to step 575.

In step 575, depending on the predefined timeout, an OS boot failure is determined after the predefined timeout period elapses without the OS fully booting up. If it is determined that the predetermined timeout has passed without a successful OS boot up, control is passed to step 585.

In step 580, after an OS boots up successfully, the automated OS and application testing is started by OS/application verification logic 460. In embodiments of the invention, OS/application verification logic 460 process can be run on a remote computer, on a hypervisor, or directly inside the test VM with the test application being injected into (or already present in) the test VM. As would be apparent to one of skill in the relevant art(s), the restored application is an application using files restored from the image level backup. In cases when a remote computer is leveraged, routing appliance 180 routes network requests to the test network. In an embodiment, OS/application verification logic 460 provides commands corresponding to application tests to be performed to the test VM. For example, the status of a test VM 470 for a MICROSOFT™ Exchange server may be determined by querying the Exchange application using an application programming interface (API) call or sending a test email using the Exchange application hosted on the test VM 470 hosting the MICROSOFT™ Exchange server. After automated OS and application testing is completed, control is passed to step 585.

In step 585, test results are reported. In accordance with an embodiment of the invention, this step comprises displaying results to a user by displaying them in UI 115 within backup verification operator console 410. Alternatively, step 585 may be performed by sending automated notifications. The automated notifications may be one of more of an email message, a log entry in a data file, a Short Message Service (SMS) text message, a fax, an Instant Message (IM), or an automated posting to a website. At this point, the backup verification is complete.

Once the backup verification process is completed, unless an operator has opted to perform additional manual verification, test VMs 470 are shut down in step 590. Step 590 is optional in that test VMs 470 are not shut down if there are additional backup verifications to be performed.

In step 595, the hypervisor 150 configuration is cleaned up (e.g., test VMs 470 are removed from the configuration of hypervisor 150), and changes storage 140 data is deleted.

The application process stops and the method ends in step 599.

Systems for Backup Verification

Figure 6:
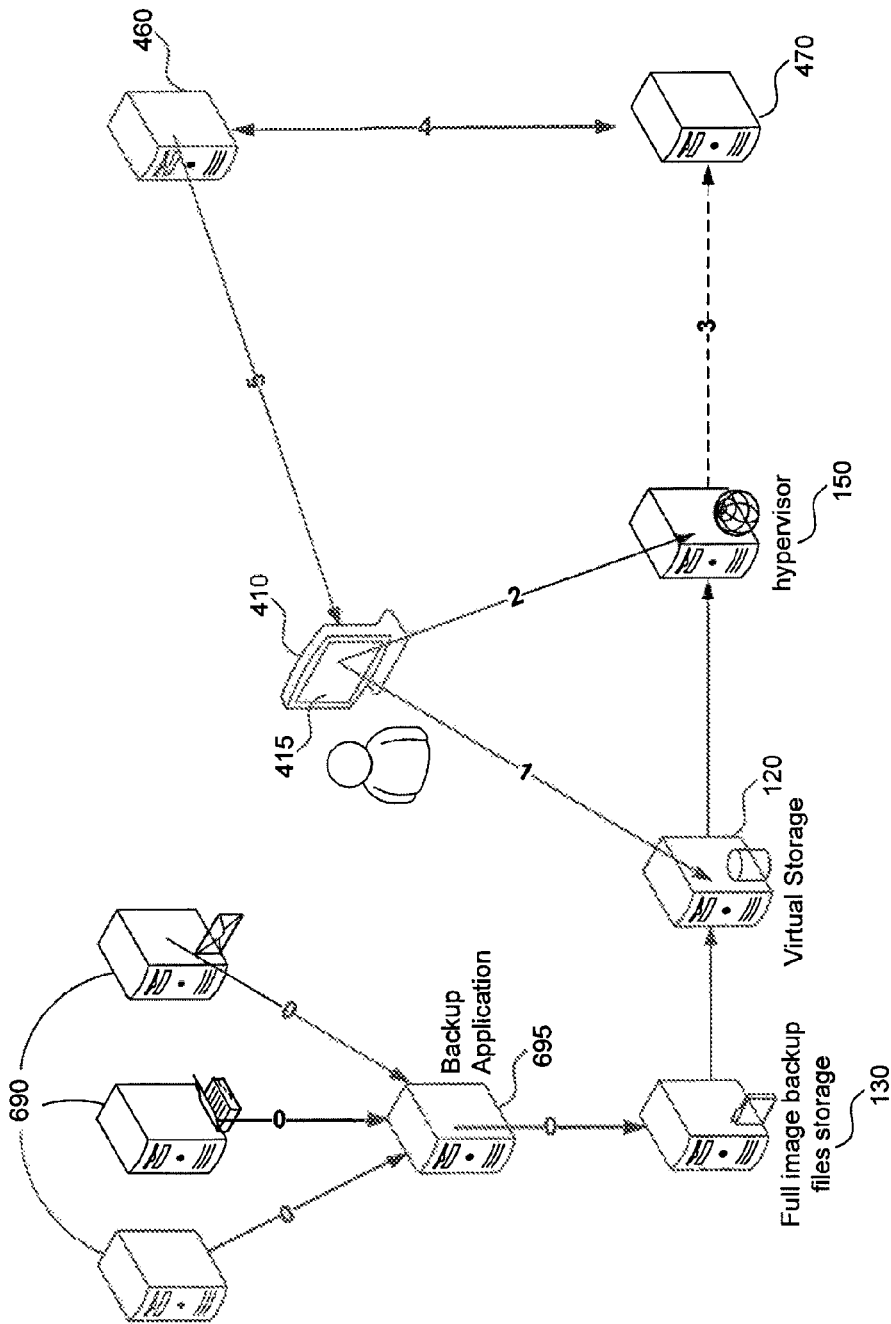
FIGS. 6 and 7 depict a system for backup verification, in accordance with an embodiment of the present invention.
Figure 7:
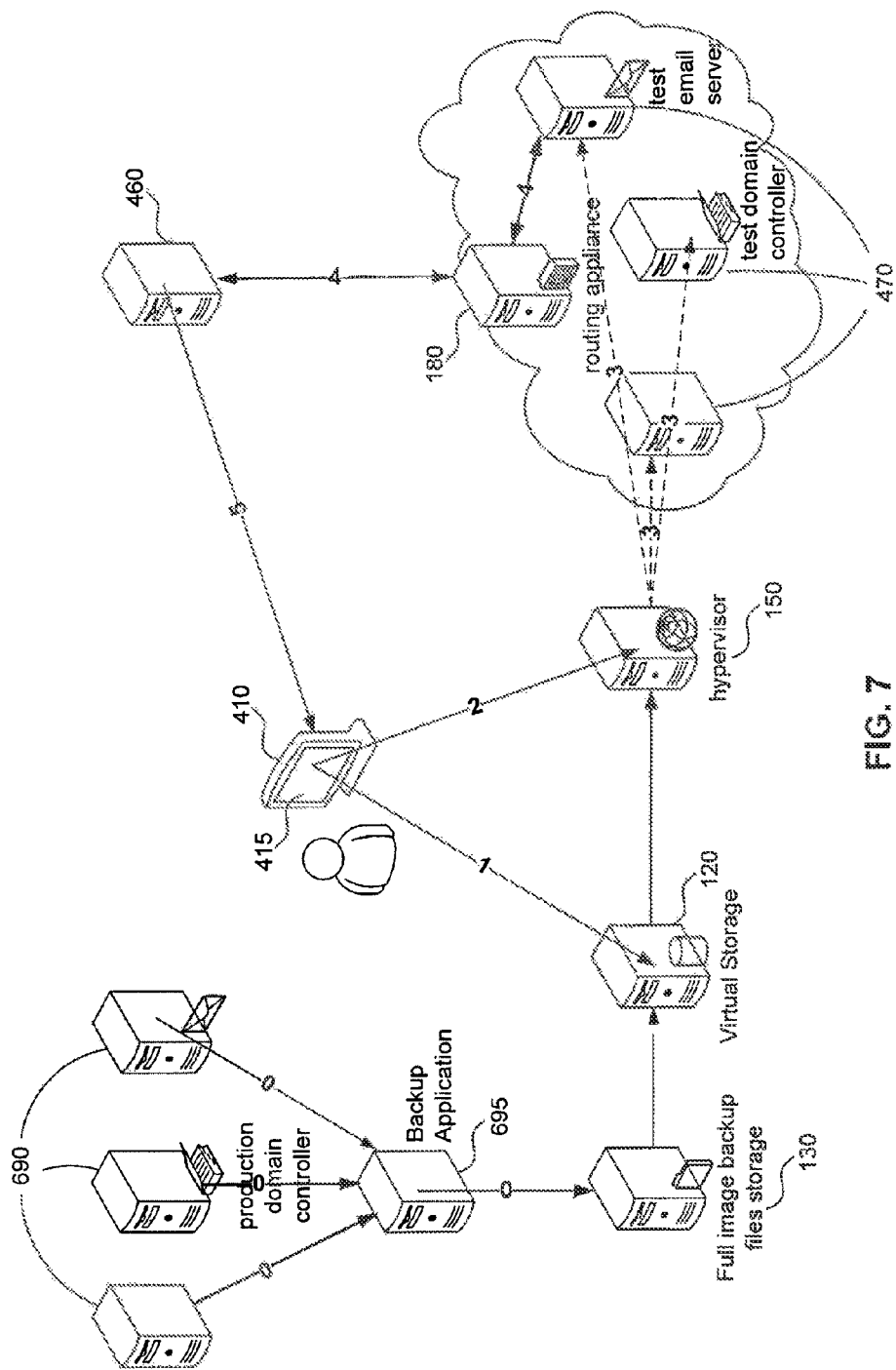

FIGS. 6 and 7 illustrate exemplary systems used for backup verification. FIGS. 6 and 7 are described with continued reference to the embodiments illustrated in FIGS. 1, 3, and 4. However, FIGS. 6 and 7 are not limited to those embodiments.

FIG. 6 is an example backup verification system 600 including a server hosting backup application 695. Although a dedicated server is depicted for hosting backup application 695 in system 600, it is understood that backup application 695 may reside on a shared application server (not shown).

The operations of system 600 are depicted as stages 1-5 in FIG. 6. In an embodiment, the stages may correspond to steps of flowchart 500 discussed above with reference to FIG. 5. An image-level backup of production server is performed by backup application 695 at stage 0 (i.e., at some point in time), and the produced backup is saved in backup storage. In the exemplary embodiment illustrated in FIG. 6, production VM includes a file server. In accordance with an embodiment of the invention, backup storage can be remote backup files storage 130. According to an embodiment, at stage 1, a user, using UI 115 within backup verification operator console 410 chooses a backup file, a restoration point to test, and one or more applications to test. Any additional services the tested applications depend upon are specified in stage 1 as well. Virtual storage 120 is then configured according to the user's selections in backup verification operator console 410 by publishing the required VM's data files to hypervisor from backup files located on remote backup files storage 130. Once the required backup files are mounted, virtual storage 120 can then start to respond to data requests over the network. At the end of stage 1, virtual storage 120 appears on the network and is ready to server remote requests.

At stage 2, hypervisor 150 is instructed to connect the virtual storage 120 to itself as a datastore. Virtual storage provides the requested data blocks of VM data files in the native format by uncompressing only the required portions of backup file on the fly as they are requested. After the storage is mounted, hypervisor 150 is instructed to register the required test VMs 470 using the VM data files located on virtual storage 120. In an embodiment of the invention, test VM 470 illustrated in FIG. 6, may be a test file server.

At stage 3, tests VM 470 is started in a production network.

In stage 4, once the operating system inside test VM 470 fully boots up and is running, OS/application verification logic 460 is used to perform the required testing against the operating systems or running applications.

In stage 5, test results are reported to backup verification operator console 410.

FIG. 7 illustrates another, more complex system 700 for performing backup verification. FIG. 7 is described with continued reference to the embodiments illustrated in FIGS. 1, 3, 4, and 6. However, FIG. 7 is not limited to those embodiments.

The operations of system 700 are depicted as phases 1-5 in FIG. 7, with phase 0 being the starting point when an image level backup of production servers 690 has already been performed by backup application 695 and stored in remote backup files storage 130. In the exemplary embodiment illustrated in FIG. 6, production VM includes a MICROSOFT™ Exchange email server, a DNS server, and an Active Directory domain controller (DC).

In phase 1, a user using UI 415 within backup verification operator console 410 selects a backup file for virtual storage 120 to use. In this phase, UI 415 is also used to select a restore point, application, and application items to restore to configure virtual storage 120 for publishing. As shown in FIG. 7, remote backup files storage 130 is connected to virtual storage 120.

In phase 2, OS/application verification logic 460 starts up test VMs 470 which are needed to support the selected application from phase 1. For example, Exchange application is dependent on presence of functioning DNS and Domain Controller servers, so in order to verify successful Exchange application recovery, all these servers must be present in the test environment. In an embodiment, during this phase, test VMs 470 are launched by hypervisor 150 using VM data files from an uncompressed backup file that has not been decrypted, decompressed, or fully extracted (i.e., without prior 'de-staging' of all VM data files from backup file to the hypervisor 150 storage). After the virtual storage 120 is mounted, hypervisor 150 is instructed to register the required test VMs 470 using the VM data files located on virtual storage 120. VM configuration is then modified changing the VM's work network from production network to the designated isolated test network containing the test VMs 470, so that test VMs do not affect production network (for example, having duplicate domain controllers on the same network will cause Active Directory issues).

In phase 3, the selected test VMs are started and run by hypervisor 150. Tests VMs 470 are running in a dedicated test network, which is isolated from the main production servers 690. OS/application verification logic 460 can access the test network and test VMs 470 via routing appliance 180.

As shown in FIG. 7, system 700 includes a test email server, test DNS server, and a test domain controller. As would be understood by one skilled in the art, production servers 690 and test VMs 470 may include other application servers not shown in FIG. 7 such as, but not limited to, one or more database servers or one or more servers hosting other enterprise applications. For example if production servers 690 include database servers such as ORACLE™, SYBASE™, MYSQL™, or MICROSOFT™ SQL SERVER™; then the backup file will include backups of the VM running the corresponding database applications. In this way, test VMs 470 will additionally include VMs for corresponding database servers listed above In phase 4, once the test VMs 470 OS and application hosted on the test VM 470 starts responding to API queries, OS/application verification logic 460 connects to the applications using existing OS and application's APIs, with routing appliance 180 provides ability to establish connection between OS/application verification logic 460 running in production network, and test VMs 470 running in isolated networks. At this point, the functionality of the OS application is checked by running OS and application tests. In an embodiment, these tests may be automated with test scripts (predefined, or custom scripts specified by user). Alternatively, the tests in phase 4 may include manual verification via user-initiated steps.

In phase 5, test results are reported to backup verification operator console 410.

As would be apparent to one of skill in the relevant art(s), the methods and systems described herein to perform fully automated backup verification without requiring complete backup extraction or repetitive manual operations are much more efficient than manual backup testing techniques or systems which require complete backup extraction in order to verify backups.

Example Backup Verification User Interface

FIGS. 8-11 illustrate a graphical user interface (GUI), according to an embodiment of the present invention. The GUI depicted in FIGS. 8-11 is described with reference to the embodiments of FIGS. 1 and 4-7. However, the GUI is not limited to those example embodiments. For example, the GUI may be the UI 415 within backup verification operator console 410 used to select backup testing parameters, as described in step 520 above with reference to FIG. 5. The GUI may also be a UI for hypervisor 150 used to create, configure, and launch test VMs as described in step 560 above with reference to FIG. 5.

Although in the exemplary embodiments depicted in FIGS. 8-11 the GUI is shown as an interface running on a computer terminal, it is understood that the GUI can be readily adapted to execute on a display of other platforms such as mobile device platforms running various operating systems, or another display of a computing device. For example, in an embodiment of the invention, the GUI illustrated in FIGS. 8-11 can be displayed on a mobile device having an input device and a display.

Throughout FIGS. 8-11, displays are shown with various icons, command regions, buttons, and data entry fields, which are used to initiate action, invoke routines, launch displays, enter data, view data, or invoke other functionality. The initiated actions include, but are not limited to, selecting backup testing parameters, selecting test VMs 470, launching test VMs 470, selecting the boot priority/sequence of test VMs 470, selecting an application group to test, and displaying test results. For brevity, only the differences occurring within the figures, as compared to previous or subsequent ones of the figures, are described below.

Figure 8:
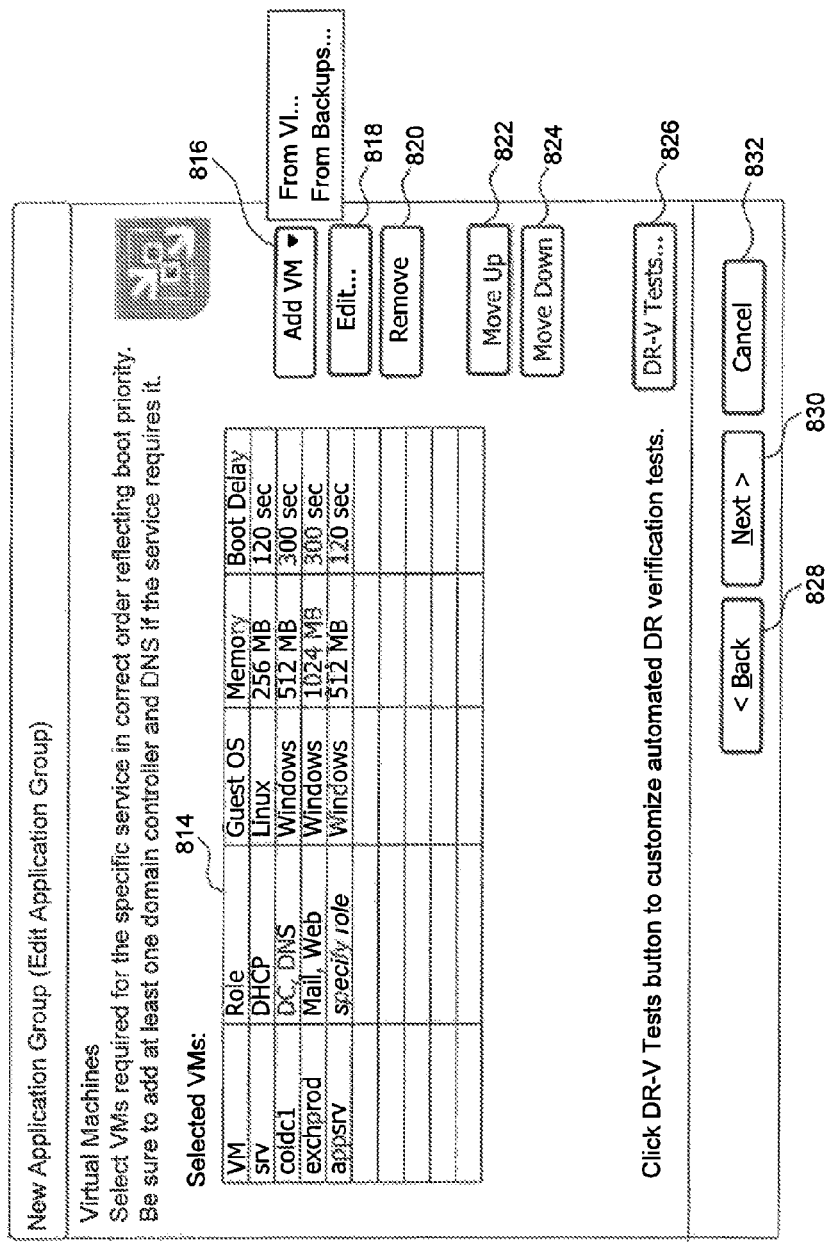

FIG. 8 illustrates an exemplary application group interface 800, wherein pluralities of test VMs 470 can be selected by a user and displayed in command region 814. By selecting, using an input device (not shown), one or more test VMs 470 can be added by selecting or 'clicking' on Add VM button 816. For example, through moving a pointer or cursor within application group interface 800 within and between each of the command regions 814 and buttons 816, 818, 820, 822, 824, 826, 828, 830, and 832 displayed in a display, a user can add, display, and edit one or more test VMs 470. In an embodiment, the display may be a computer display 1230 shown in FIG. 12, and application group interface 800 may be display interface 1202. According to embodiments of the present invention, the input device can be, but is not limited to, for example, a touch screen, a keyboard, a pointing device, a track ball, a touch pad, a joy stick, a voice activated control system, or other input devices used to provide interaction between a user and interface 800.

In accordance with an embodiment of the invention, if Add VM button 816 is selected, a list of VMs is presented from a selected image level backup. Alternatively, a list of VMs may be presented based on all available VMs in the system. The selected test VMs 470 can be edited by clicking on Edit button 818 and removed by clicking on Remove button 820. If the boot sequence or priority of test VMs 470 needs to be changed, the Move Up button 822 and Move Down button 824 can be clicked by a user. Once the test VMs 470 have been selected, edited, and sequenced in application group interface 800, a user can click on DR-V Tests button 826 to launch an interface for customizing data recovery (DR) verification tests (i.e., image level backup verification tests). The Back button 828 can be selected to return to the previous screen and the Next button 830 can be used to navigate to the next screen of the GUI. If the user does not wish to use the test VMs selected in application group interface 800, Cancel button 832 can be selected.

FIG. 9 illustrates an exemplary new verification job interface 900, wherein an application group selected in application group interface 800 is listed in drop down menu 934. The description of the application group listed in drop down menu 934 is displayed in region 935 of interface 900. If a user selects a different application group in drop down menu 934, the selected application group description in region 935 will change accordingly. In new verification job interface 900, pluralities of application group settings and their respective backup statuses are displayed in window 936.

Figure 10:
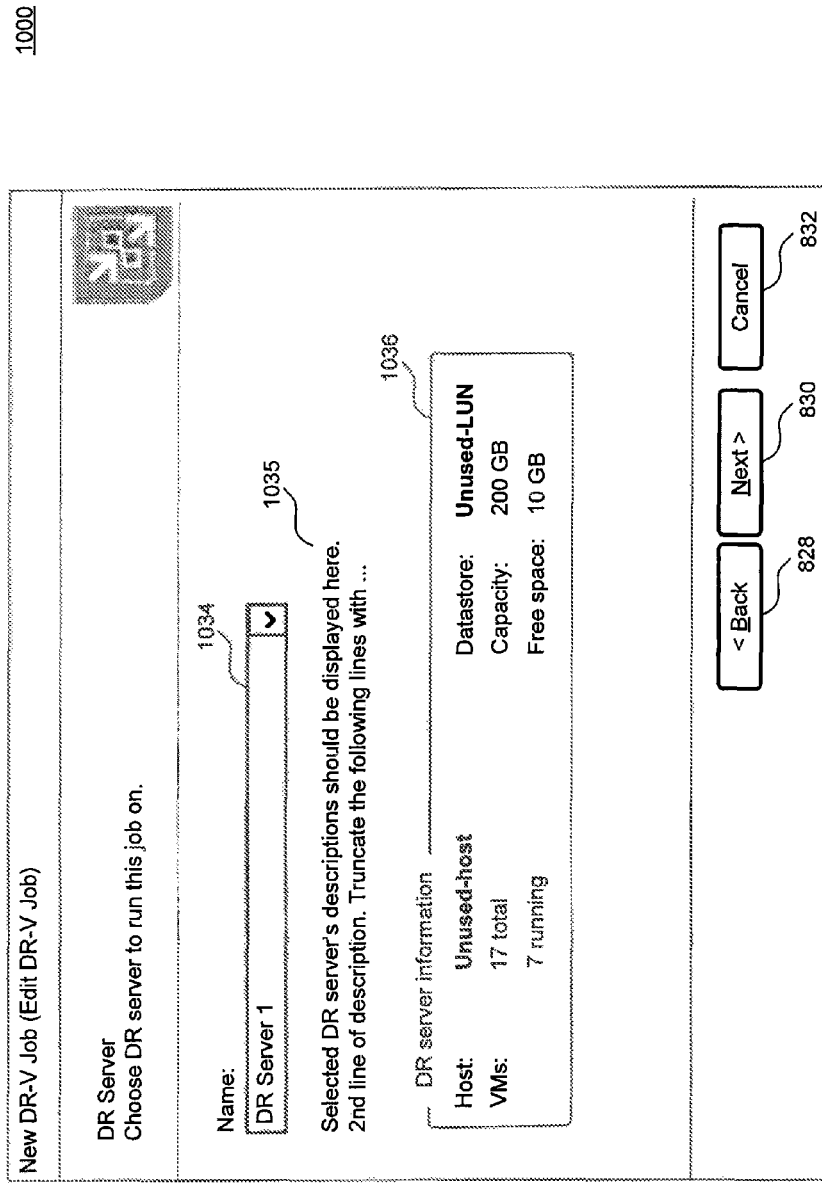

FIG. 10 illustrates an exemplary data verification (DR) sever interface 1000, wherein a DR sever can be selected within drop down menu 1034. The DR server selected within interface 1000 is the server where the test VMs 470 will run. The description of selected DR server in drop down menu 1034 is displayed in region 1035 of interface 1000. If a user selects a different DR server in drop down menu 1034, the selected DR server description in region 1035 will change accordingly. In DR server interface 1000, DR server information is displayed in window 1036. In the exemplary embodiment illustrated in FIG. 10, the DR server information displayed in window 1036 includes the number of test VMs 470 running, the DR server's total storage capacity in gigabytes (GBs), and the space available or free on the DR server in GBs.

FIG. 11 illustrates an exemplary test settings interface 1100, wherein backup testing parameters can be selected within command region 1134. In an embodiment, interface 1100 can be used to select backup testing parameters, as described in step 520 above with reference to FIG. 2. The backup testing parameters selected within interface 1100 comprise the tests to be performed for each test VM 470 in the application group selected in interface 900. When the backup testing parameters have been selected and customized in command region 1134, OK button 1138 can be selected to save the settings. Additionally, once the backup testing parameters are selected in command region 1134, Test Live VM button 1136 can be selected to try to perform the selected tests on production VMs.

Example Computer System Implementation

Figure 12:
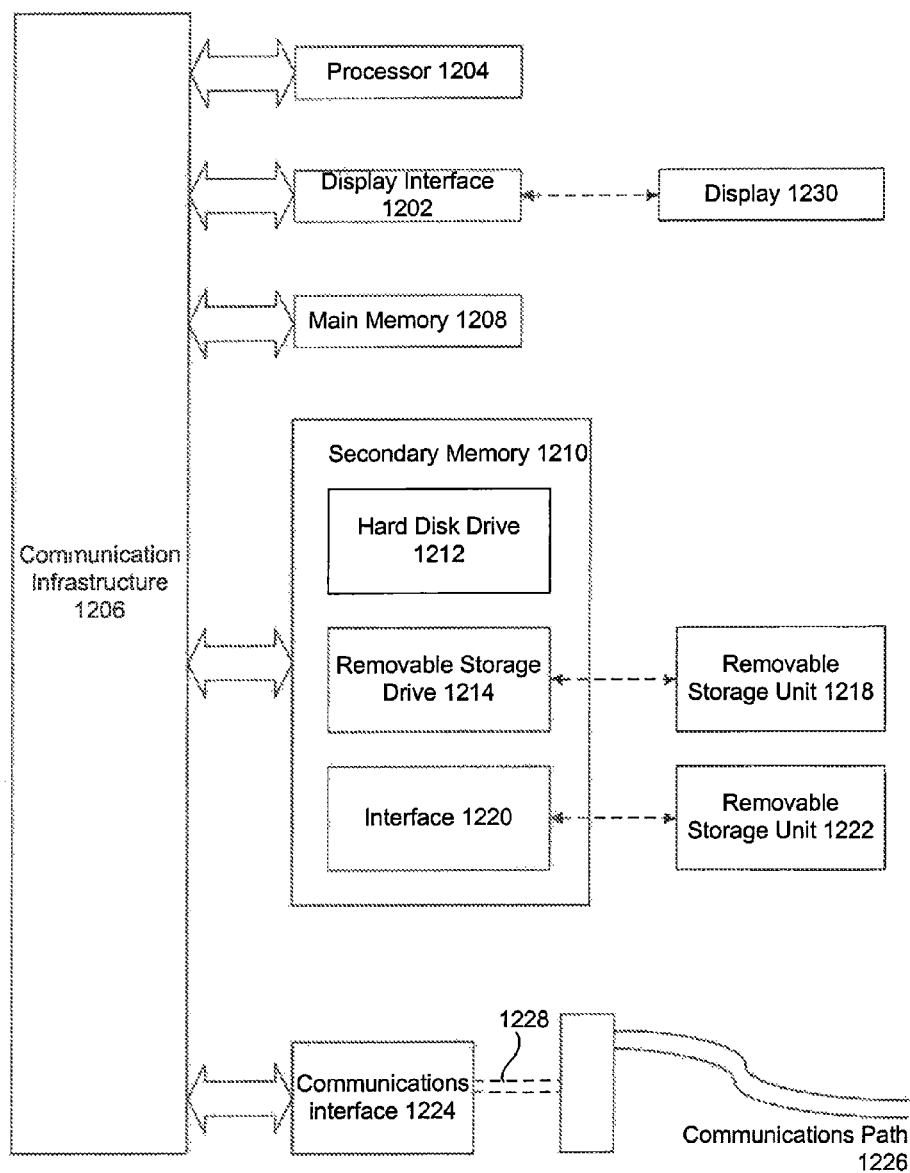
FIG. 12 depicts an example computer system in which the present invention may be implemented.

Various aspects of the present invention can be implemented by software, firmware, hardware, or a combination thereof. FIG. 12 illustrates an example computer system 1200 in which the present invention, or portions thereof, can be implemented as computer-readable code. For example, the methods illustrated by the flowcharts 200 and 500 of FIGS. 2 and 5 can be implemented in system 1200. Item restoration and backup verification systems 300 and 400 of FIGS. 3 and 4, respectively, can also be implemented in system 1200. Various embodiments of the invention are described in terms of this example computer system 1200. After reading this description, it will become apparent to a person skilled in the relevant art how to implement the invention using other computer systems and/or computer architectures.

Computer system 1200 includes one or more processors, such as processor 1204. Processor 1204 can be a special purpose or a general-purpose processor. Processor 1204 is connected to a communication infrastructure 1206 (for example, a bus, or network).

Computer system 1200 also includes a main memory 1208, preferably random access memory (RAM), and may also include a secondary memory 1210. Secondary memory 1210 may include, for example, a hard disk drive 1212, a removable storage drive 1214, flash memory, a memory stick, and/or any similar non-volatile storage mechanism. Removable storage drive 1214 may comprise a floppy disk drive, a magnetic tape drive, an optical disk drive, a flash memory, or the like. The removable storage drive 1214 reads from and/or writes to a removable storage unit 1218 in a well-known manner. Removable storage unit 1218 may comprise a floppy disk, magnetic tape, optical disk, etc. which is read by and written to by removable storage drive 1214. As will be appreciated by persons skilled in the relevant art(s), removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 are in the form of signals, which may be electronic, electromagnetic, optical, or other signals capable of being received by communications interface 1224. These signals are provided to communications interface 1224 via a communications path 1226. Communications path 1226 carries signals and may be implemented using wire or cable, fiber optics, a phone line, a cellular phone link, an RF link or other communications channels.

Computer system 1200 may additionally include computer display 1230. According to an embodiment, computer display 1230, in conjunction with display interface 1202, can be used to display UIs 115 and 415 on restoration operator console 110 and backup verification operator console 410, respectively. Computer display 1230 may also be used to display the GUI interfaces depicted in FIGS. 8-11.

In this document, the terms "computer program medium" and "computer usable medium" are used to generally refer to non-transitory media such as removable storage unit 1218, removable storage unit 1222, and a hard disk installed in hard disk drive 1212. Signals carried over communications path 1226 can also embody the logic described herein. Non-transitory computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor 1204 to implement the processes of the present invention, such as the steps in the methods illustrated by flowcharts 200 and 500 of FIGS. 2 and 5 and systems 300, 600, and 700 of FIGS. 3, 6, and 7 discussed above. Accordingly, such computer programs represent controllers of the computer system 1200. Where the invention is implemented using software, the software may be stored in a computer program product and loaded into computer system 1200 using removable storage drive 1214, interface 1220, hard drive 1212, or communications interface 1224.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system for verifying virtual machine (VM) data files, comprising:
    a data conversion engine configured to translate requested content of an image from an image level backup by extracting corresponding contents of the image level backup without fully extracting the image, and to represent the extracted contents to a hypervisor in a native image format; and
    a verification module configured to test an operating system (OS) or an application of a test VM launched using the extracted contents using backup testing parameters.

2. The system of claim 1, further comprising:
    a routing appliance connected to a production network and an isolated network, wherein the routing appliance is configured to route network traffic between the production network and the isolated network.

3. The system of claim 1, further comprising:
    a changes storage configured to store test VM virtual disk data changes resulting horn running and testing the test VM.

4. The system of claim 3, wherein the hypervisor has disk input output (I/O) redirection capabilities, and wherein the changes storage is implemented using the disk I/O redirection capabilities of the hypervisor.

5. The system of claim 3, wherein the changes storage is implemented using backup file storage device capabilities.

6. The system of claim 1, further comprising an operator console having a user interface configured to receive the backup testing parameters.

7. The system of claim 1, wherein the backup testing parameters comprise one or more of:
    a read-only image level backup file repository for the image level backup;
    backup file entities when the image level backup contains image level backups of multiple VMs;
    data objects within the image level backup;
    a recovery point; and
    an application test to perform.

8. The system of claim 7, wherein the recovery point comprises one of a specific hour, minute and second of a day the image level backup was created.

9. A method for verifying an image level backup, comprising:
    receiving a selection of a data object from the image level backup, wherein the data object is associated with an application;
    partially translating without fully extracting the image level backup to extract the data object and to provide the data object to a hypervisor;
    determining if an operating system (OS) of a test virtual machine (VM) has booted successfully; and
    executing tests of the test VM using the data object and its associated application in response to determining that the OS has booted successfully.

10. The method of claim 9, wherein the determining comprises determining if the OS has booted up within a predetermined amount of time.

11. The method of claim 9, wherein the tests comprise one or more of: automated scripts and executables.

12. The method of claim 11, wherein the tests further comprise user-initiated steps.

13. The method of claim 9, wherein the tests comprise at least one of:
    pinging the test VM;
    querying a status of a process or a service expected to be running on the test VM;
    querying contents of an OS running on the test VM;
    querying contents of an application log file;
    querying an events database;
    establishing a connection to running applications using application programming interfaces (APIs);
    running scripts or executable files against applications executing on the test VM; and
    leaving the test VM running to allow for manual verification by an operator.

14. The method of claim 9, further comprising launching the test VM by the hypervisor.

15. The method of claim 9, further comprising:
    displaying results of the executed tests; and
    generating an automated notification containing the results of the executed tests.

16. The method of claim 9, further comprising:
    generating an automated notification in response to determining that the test VM did not launch or the OS has not booted successfully.

17. The method of claim 16, wherein the automated notification includes at least one of:
    an email message;
    a log entry in a data file;
    a Short Message Service (SMS) text message;
    a facsimile;
    a user interface output;
    an Instant Message (IM); and
    an automated submission to a website.

18. The method of claim 9, further comprising:
    displaying results of the executed tests;
    shutting down the test VM; and
    deleting data from a changes storage which is configured to store disk data changes resulting from verification of the image level backup.

19. A non-transitory computer-readable storage medium having computer-executable instructions stored thereon that, in response to being executed by a processor, cause the processor to perform operations for verifying an image level backup, the operations comprising:
    receiving a selection of a data object from the image level backup, wherein the data object is associated with an application;
    partially translating without fully extracting the image level backup to extract the data object and providing the data object to a hypervisor;
    determining if an operating system (OS) of a test virtual machine (VM) has booted successfully; and
    executing tests of the test VM using the data object and its associated application in response to determining that the OS has booted successfully.

20. The non-transitory computer-readable storage medium of claim 19, the operations further comprising:

receiving backup testing parameters comprising at least one of: a test script and an executable file location, a recovery point to test, and one or more application tests to perform.

21. A system for item-level restoration, the system comprising:
- an operator console having a user interface;
- at least one restored virtual machine (VM) launched on a hypervisor;
- an image level backup file storage configured to store a partially translated image level backup file having at least one application item extracted to represent to the hypervisor in a native format; and
- an application item-level restore module connected to the hypervisor and accessible by the operator console,
- wherein the user interface of the operator console is configured to receive item restoration parameters and to provide the item restoration parameters to the application item-level restore module, and
- wherein the application item-level restore module is configured to fetch and restore application items corresponding to the item restoration parameters from the image level backup file storage.

22. The system of claim 21 further comprising:
- a plurality of restored VMs launched on the hypervisor; and
- a routing appliance connected to a production network and an isolated network, wherein the routing appliance is configured to route network traffic between the production network and the isolated network.

23. The system of claim 22, wherein the plurality of restored VMs are started according to a restored VM dependency list.

24. The system of claim 21, wherein the application item-level restore module comprises application item level restore logic.

25. The system of claim 21, wherein the item restoration parameters comprise at least one of:
- an Internet Protocol (IP) address or other identification of a virtualized service;
- an application item to be fetched; and
- a location for saving restored items.

26. A method for item-level restoration, the method comprising:
- receiving restore parameters, wherein the restore parameters include at least a restore location;
- accessing an image level backup;
- creating a restored virtual machine (VM) on a hypervisor using the image level backup;
- configuring and launching the restored VM;
- configuring restore logic;
- providing the restore parameters to the restore logic; and
- restoring items of the restored VM as defined by the restore parameters and saving the items into the restore location.

27. The method of claim 26, further comprising:
- shutting down the restored VM; and
- deleting the restored VM from the hypervisor.

28. A system for recovering a virtual machine (VM) from an image level backup, comprising:
- a data conversion engine configured to translate requested content of an image from the image level backup by extracting corresponding contents of the image level backup without fully extracting the image, and to represent the extracted contents when requested by a hypervisor in a native image format; and
- a module, connected to the hypervisor, configured to perform automated recovery of the VM using the extracted contents according to restore parameters.

* * * * *

UNITED STATES PATENT AND TRADEMARK OFFICE
CERTIFICATE OF CORRECTION

PATENT NO. : 8,745,444 B2
APPLICATION NO. : 13/833434
DATED : June 3, 2014
INVENTOR(S) : Timashev et al.

It is certified that error appears in the above-identified patent and that said Letters Patent is hereby corrected as shown below:

In the Claims

Column 23, line 35, claim 3, please replace "horn" with --from--.

Signed and Sealed this
Twenty-first Day of October, 2014

Michelle K. Lee
*Deputy Director of the United States Patent and Trademark Office*